United States Patent
Batanov, III et al.

(10) Patent No.: US 12,493,633 B2
(45) Date of Patent: Dec. 9, 2025

(54) DYNAMIC CARDINALITY-BASED GROUP SEGMENTATION

(71) Applicant: Tealium Inc., San Diego, CA (US)

(72) Inventors: Ivan Batanov, III, San Diego, CA (US); John Joshua Roach, San Diego, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 18/534,317

(22) Filed: Dec. 8, 2023

(65) Prior Publication Data

US 2024/0220513 A1 Jul. 4, 2024

Related U.S. Application Data

(63) Continuation of application No. 17/897,991, filed on Aug. 29, 2022, now Pat. No. 11,841,880.

(60) Provisional application No. 63/260,751, filed on Aug. 31, 2021.

(51) Int. Cl.
| | | |
|---|---|---|
| G06F 16/00 | (2019.01) | |
| G06F 16/2455 | (2019.01) | |
| G06F 16/28 | (2019.01) | |

(52) U.S. Cl.
CPC ...... *G06F 16/285* (2019.01); *G06F 16/24554* (2019.01)

(58) Field of Classification Search
None
See application file for complete search history.

(56) References Cited

U.S. PATENT DOCUMENTS

| | | |
|---|---|---|
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,081,789 B2 | 7/2015 | Anderson |
| 9,116,608 B2 | 8/2015 | Koo et al. |
| 9,313,287 B2 | 4/2016 | Glommen et al. |
| 9,357,023 B2 | 5/2016 | Glommen et al. |
| 9,363,311 B1 | 6/2016 | McWilliams et al. |
| 9,479,609 B2 | 10/2016 | Anderson |
| 9,537,964 B2 | 1/2017 | Glommen et al. |
| 9,635,100 B2 | 4/2017 | McWilliams et al. |
| 9,690,868 B2 | 6/2017 | Anderson |
| 9,753,898 B1 | 9/2017 | Glommen et al. |
| 9,769,252 B2 | 9/2017 | Glommen et al. |
| 9,787,795 B2 | 10/2017 | Anderson |
| 9,807,184 B1 | 10/2017 | Slovak et al. |
| 10,003,639 B2 | 6/2018 | McWilliams et al. |
| 10,078,708 B2 | 9/2018 | Slovak |

(Continued)

*Primary Examiner* — Anhtai V Tran
(74) *Attorney, Agent, or Firm* — Knobbe Martens Olson & Bear LLP

(57) ABSTRACT

Systems and methods are provided for analysis and selection of attributes used to segment data entities. The attributes used to segment data entities may be analyzed to identify segments of data entities (e.g., distinct audiences of visitors) that share values for a given subset of attributes. By intelligently selecting attributes for use in the segmentation process based on the values that they may take (e.g., the cardinality of the attributes), the selected attributes can be used to generate a reasonable or otherwise desirable number of data entity segments. Other attributes can be excluded from the segmentation process.

20 Claims, 9 Drawing Sheets

(56) References Cited

U.S. PATENT DOCUMENTS

| | | |
|---|---|---|
| 10,110,690 B2 | 10/2018 | Slovak et al. |
| 10,133,709 B2 | 11/2018 | Glommen et al. |
| 10,187,456 B2 | 1/2019 | Glommen et al. |
| 10,241,986 B2 | 3/2019 | Anderson et al. |
| 10,268,657 B2 | 4/2019 | Kirk et al. |
| 10,282,383 B2 | 5/2019 | Anderson |
| 10,327,018 B2 | 6/2019 | Anderson et al. |
| 10,356,191 B2 | 7/2019 | Glommen et al. |
| 10,432,701 B2 | 10/2019 | McWilliams et al. |
| 10,476,977 B2 | 11/2019 | Slovak et al. |
| 10,484,498 B2 | 11/2019 | Anderson |
| 10,558,728 B2 | 2/2020 | Slovak |
| 10,635,853 B2 | 4/2020 | Glommen et al. |
| 10,817,664 B2 | 10/2020 | Anderson et al. |
| 10,831,852 B2 | 11/2020 | Anderson |
| 10,834,175 B2 | 11/2020 | Glommen et al. |
| 10,834,216 B2 | 11/2020 | Slovak et al. |
| 10,834,225 B2 | 11/2020 | Anderson |
| 10,951,687 B2 | 3/2021 | McWilliams et al. |
| 10,990,641 B2 | 4/2021 | Kirk et al. |
| 11,089,344 B2 | 8/2021 | Anderson et al. |
| 11,095,735 B2 | 8/2021 | Gavin et al. |
| 11,140,233 B2 | 10/2021 | Glommen et al. |
| 11,146,656 B2 | 10/2021 | Rouse et al. |
| 11,281,845 B2 | 3/2022 | Glommen et al. |
| 11,310,327 B2 | 4/2022 | Slovak et al. |
| 11,314,815 B2 | 4/2022 | Slovak |
| 11,347,824 B2 | 5/2022 | Anderson |
| 11,405,670 B2 | 8/2022 | Anderson et al. |
| 11,425,190 B2 | 8/2022 | McWilliams et al. |
| 11,438,439 B1 | 9/2022 | Andrew et al. |
| 11,483,378 B2 | 10/2022 | Glommen et al. |
| 11,537,683 B2 | 12/2022 | Kirk et al. |
| 11,570,273 B2 | 1/2023 | Anderson |
| 11,593,554 B2 | 2/2023 | Anderson et al. |
| 11,622,019 B2 | 4/2023 | Slovak et al. |
| 11,622,026 B2 | 4/2023 | Rouse et al. |
| 11,671,510 B2 | 6/2023 | Gavin et al. |
| 11,695,845 B2 | 7/2023 | Glommen et al. |
| 2002/0161561 A1* | 10/2002 | Sarma ................ G06Q 10/04 703/2 |
| 2019/0362017 A1 | 11/2019 | Salomon et al. |
| 2021/0165786 A1* | 6/2021 | Halstead ........ G06F 16/24544 |

\* cited by examiner

DYNAMIC CARDINALITY-BASED GROUP SEGMENTATION

RELATED APPLICATIONS

Any and all applications for which a domestic priority claim is identified in the Application Data Sheet of the present application are hereby incorporated by reference under 37 CFR 1.57.

BACKGROUND

Some operators of content sites, such as websites, obtain the results of analytics performed with regard to user interactions on their content sites. User analytics can include any type of data regarding interactions of end users with content sites, among other types of data. There are different approaches to gathering analytics data, which include using tracking messages or employing the use of tags. The analysis of the data can be based on and/or result in grouping users into audiences or other groups.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Introduction

Figure 1:
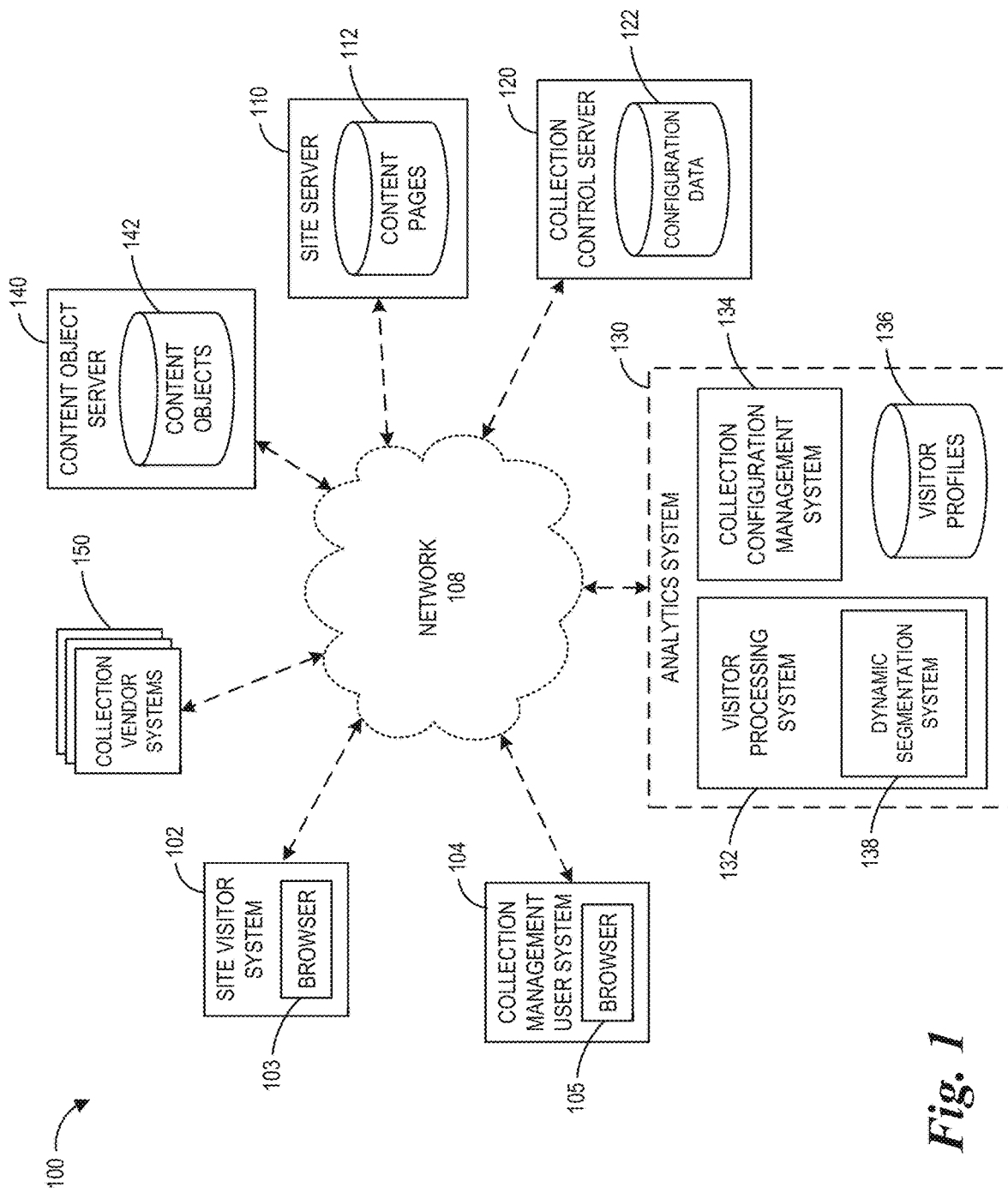
FIG. 1 is a diagram of an illustrate computing environment in which user interaction data may be managed according to some embodiments.

Consumers of content include visitors to network-based content sites and other users of applications that present content. The consumers may be represented within a data analytics system as data entities (e.g., visitor data entities). Data entities may have or otherwise be associated with any number of attributes. For example, a visitor data entity that represents a particular content site visitor may have a set of attributes, such as identification data, contact data, account-level data, preference data, demographic data, etc. These attributes describe the visitor, are observed from content interactions of the visitor (e.g., requests, commands, purchases, etc.), or are otherwise associated with the visitor. A collection of visitor data entities that represent various visitors may be segmented into groups, or "audiences," based on the attributes of data entities in the collection. Segmentation of data entities in this way may facilitate various features, such as recommendations, content targeting, and the like.

Some systems maintain large numbers of attributes (e.g., hundreds, thousands, or more) for an even larger number of data entities (e.g., millions), which can make it difficult or impossible for users of the systems to understand how the data entities can be optimally segmented. In an effort to simplify and understand the segmentation process, some systems implement segmentation of data entities using pre-determined heuristics intended to provide practical solutions without necessarily requiring the resources typically expended to develop optimized solutions. For example, users who add items to an online shopping cart but do not complete the purchase may be segmented into a group referred to as "abandoners." However, such segmentation heuristics are at best based on preconceived notions of commonality among data entities, and may not be supported by current data or may not be based on any data analysis at all. Decisions made based on data entity segmentation implemented using such methods may be sub-optimal, and in some cases may be counterproductive. For example, recommendations and content targeting that is based on preconceived notions may result in a lower percentage of conversions or other favorable responses than expected.

Some aspects of the present disclosure address the issues noted above, among others, through analysis and selection of attributes used to segment data entities. The attributes used to segment data entities may be analyzed to identify segments of data entities (e.g., distinct audiences of visitors) that share values for a given subset of attributes. By intelligently selecting attributes for use in the segmentation process based on the values that they may take, the selected attributes can be used to generate a reasonable or otherwise desirable number of data entity segments. Other attributes can be excluded from the segmentation process.

Some attributes may take any of a set of discrete values (e.g., a set of 2, 10, 50, or more individual values). In some embodiments, the set of values may be analyzed to determine the quantity of distinct values that the attribute may take. If the quantity exceeds an upper threshold, the attribute may not be a good candidate for use in segmentation. For example, if there are too many possible values and too few data entities have the same value for the attribute, then it may be difficult to obtain meaningful grouping of the data entities based on that particular attribute. If the quantity of discrete values that the attribute may take fails to satisfy a lower threshold, then it may not be a good candidate for use in segmentation. For example, if there are too few possible values and too many data entities have the same value for the attribute, then the attribute may not provide enough of a meaningful distinction between data entities and may not be a good candidate for use in segmentation. By selecting attributes with value sets that satisfy one or more criteria, such as exceeding and/or falling below certain thresholds, better candidates for segmentation can be identified.

Additional aspects of the present disclosure relate to processing certain attributes that may not otherwise be good candidates for use in segmentation. The processed attributes, or new attributes based thereon, may be better candidates for use in segmentation. Some attributes may take any value within a continuous range (e.g., any numerical value—including any fractional value—between a minimum and a maximum), or may be effectively unbounded. Other attributes may take any of a large number of discrete values (e.g., the quantity of different values that the attribute may take exceeds a maximum threshold). Such attributes may be characterized as having a high degree of cardinality, which can result in too few data entities having the same value for the attributes. It may be difficult or impossible to obtain meaningful segmentation of data entities based on attributes that exhibit such high degrees of cardinality. By intelligently reducing the cardinality of the attributes, or generating new attributes having a desired degree of cardinality, the attributes may be better candidates for segmentation.

In some embodiments, an attribute that may take any whole or fractional value within a range may be clustered or otherwise grouped into attribute value subsets based on subsets of the range, where the number of subsets corresponds to a more desirable quantity of attribute values for segmentation. For example, attribute values between 0.00-10.00 may be clustered into cluster 1, attribute values between 10.01-14.58 may be clustered into cluster 2, etc. The cluster assignments may provide more meaningful segmentation of data entities than the larger number of un-clustered values for the attributes.

In some embodiments, an attribute may take any of a large quantity of discrete values from which a logical relationship between at least some of the discrete values can be identified. For example, there are a potentially infinite number of distinct email addresses, but some groups of email addresses share a domain. A new attribute may be derived from such an attribute, such as an email domain attribute. The new attribute may provide more meaningful segmentation of data entities than the larger number of values for the base attribute.

In some embodiments, an attribute that may take any of a set of large quantity of discrete values with no logical relationship between the different values may be excluded from consideration in the segmentation process because clusters or new attributes that provide meaningful distinctions cannot be derived. For example, there may be large number and potentially infinite number of user names, but no logical relationship between the user names can be readily determined for clustering or generating a new attribute that provides a meaningful distinction between data entities for segmentation.

Further aspects of the present disclosure relate dynamic interactive cardinality reduction. This process of dynamic interactive cardinality reduction may also be referred to as supervised cardinality reduction. The system may generate an initial determination of candidate attributes for use in segmentation, such as by selecting attributes with a desired degree of cardinality, generating new attributes representative of some attributes that do not have a desired degree of cardinality, and excluding other attributes that do not have a desired degree of cardinality. The candidate attributes may be presented to a user, such a via a graphical user interface that shows clustering of attribute values and/or the segmenting of data entities based on the candidate attributes. The user interface may enable the user to adjust various cardinality reduction parameters in order to supervise the process of cardinality reduction. For example, the user may select a different number of clusters for generated attributes that represent attributes with a high degree of cardinality. As another example, the user may select different coverage targets for clustering of such generated attributes. Upon selection or modification of cardinality reduction parameters, the system may apply the changes and re-generate or update the candidate attributes. In this way, candidate attribute selection and cardinality reduction can be data-driven but still be supervised to varying degrees depending upon the desires of the user.

Additional aspects of the present disclosure relate to dynamic interactive segmentation of data entities using candidate attributes. This process of dynamic interactive data entity segmentation may also be referred to as supervised segmentation. The system may generate an initial segmentation of data entities based on the one or more of the candidate attributes generated by the system and/or adjusted by a user. The initial segmentation may be presented to a user, such a via a graphical user interface that shows the segments of the collection of data entities. The user interface may enable the user to add, substitute, and/or remove candidate attributes in order to supervise the process of data entity segmentation. Upon selection or modification of the attributes to be used for segmentation, the system may apply the changes and re-generate or update the segments. In this way, data entity segmentation can be data-driven but still be supervised to varying degrees depending upon the desires of the user.

Various aspects of the disclosure will now be described with regard to certain examples and embodiments, which are intended to illustrate but not limit the disclosure. Although aspects of some embodiments described in the disclosure will focus, for the purpose of illustration, on particular examples of data entities, attributes, clustering methods, and segmentation methods, the examples are illustrative only and are not intended to be limiting. In some embodiments, the techniques described herein may be applied to additional or alternative data entities, attributes, clustering methods, segmentation methods, and the like.

Example Monitoring Object Management Environment

FIG. 1 illustrates a computing environment 100 for implementing various monitoring object features, data segmentation features, and data analytics features, including some or all of such features described herein. In the computing environment 100, a site visitor system 102 (also referred to simply as a "visitor system") communicates over a network 108 with a site server 110. The visitor system 102 can include any form of computing device and may be a desktop, laptop, smartphone, tablet, or the like. A browser 103 or other application software installed in the visitor system 102 accesses one or more content pages of a content site stored in content pages storage 112 of the site server 110. The content pages can be files that may be accessed remotely and provided to the visitor system 102. Accordingly, the content pages may be web pages, documents (such as pdf documents), videos, images, text, combinations of the same, or the like. The site server 110 may be a web server, an application server, a database server, combinations of the same, or the like. Further, the network 108 can include a local area network (LAN), a wide area network (WAN), a company intranet, the public Internet, combinations of the same, or the like.

A content page of the content site can incorporate one or more content objects provided by a content object server 140. The content object server 140 can store content objects in a content objects storage 142. As some examples, the content object server 140 can be a publication server or an advertising server. The content object server 140 can transmit the content objects to the site server 110 or the visitor system 102 in response to a request for a content object or may push the content objects to the site server 110 or the visitor system 102. The content objects can be web pages, documents, videos, images, text, combinations of the same, or the like. The content objects can be supplemental content from a provider other than a content site provider that provides base content for the content site. In some embodiments, one or more of the content objects can be included in a content page by the site server 110 before or when the site server 110 provides the content page to the visitor system 102. In other embodiments, the browser 103 can request and obtain one or more content objects from the content object server 140 upon loading of a content page that incorporates the one or more content objects.

A content object can include instructions for requesting a monitoring object bundle. The instructions for requesting the monitoring object bundle can include a source location address (for example, a web address) for the monitoring object bundle or other information to enable and cause the browser 103 to request or obtain the monitoring object bundle from another device, such as from a configuration data storage 122 of a collection control server 120 via the network 108. The monitoring object bundle can be a data collection monitoring object bundle that upon receipt by the browser 103 is executed and causes the browser 103 to supply user interaction, visitor identification, or other data to an analytics system 130 or collection vendor systems 150 (optionally through the collection control server 120). The monitoring object bundle, moreover, may be at least partly customized for the content object that includes instructions for requesting the monitoring object bundle. The monitoring object bundle can itself include one or more monitoring objects. In one example, the monitoring object bundle can include one or more monitoring objects and monitoring object management loader functionality. The monitoring object management loader functionality can provide the ability, for instance, to wrap a content object in order to trigger tracking upon a user interaction, such as a user selection via a mouse click, with the content object. The monitoring object bundle or monitoring object can be a data file including JavaScript™, HyperText Markup Language (HTML), JavaScript™ Object Notation (JSON), Hypertext Preprocessor (PHP), Node.js, Python, combinations of the same, or the like, in one embodiment. In other embodiments, the monitoring object bundle or monitoring object can be coded in another programming language suitable for execution by the visitor system 102. Moreover, the monitoring object bundle or monitoring object may be standalone code or component code, where component code contrasts with standalone code in that component code unlike standalone code may not be executed without complementary component code.

Additionally, or alternatively, a content object can include a monitoring object container or multiple monitoring objects, or one or more content pages of the content site can include a monitoring object container or one or more monitoring objects. Monitoring objects and monitoring object containers, such as tags and tag containers, are described in detail in U.S. Pat. No. 8,805,946, titled "SYSTEM AND METHOD FOR COMBINING CONTENT SITE VISITOR PROFILES," which is incorporated by reference herein and forms part of this disclosure.

The analytics system 130 can include a visitor processing system 132 and a collection configuration management system 134, as well as a visitor profiles storage 136. The visitor processing and collection configuration management systems 132, 134 are shown separately for illustrative purposes, although their functionality may be implemented by a single system. The analytics system 130 can also be implemented without the collection configuration management system 134, and thus, the functionality of the visitor processing system 132 can be implemented independent of any collection configuration management functionality. Further, the analytics system 130 can be implemented without the visitor processing system 132, and thus, the functionality of the collection configuration management system 134 can be implemented independent of any visitor processing functionality.

The visitor processing system 132 can enable collection management users to configure the types of data tracked for different visitors of a content site, as well as to analyze and report on this visitor data. For instance, the visitor processing system 132 can provide one or more user interfaces that enable customization of collecting information about visitors to a content site. This information can be obtained initially from a monitoring object bundle or one or more monitoring objects, which may be provided through the collection control server 120 to the visitor system 102 for execution in the browser 103. Upon execution in the browser 103, the monitoring object bundle or one or more monitoring objects can supply visitor data to the visitor processing system 132 (optionally through the collection control server 120). Such visitor data can be stored in visitor profiles in the visitor profiles storage 136. Collection management users can, for example, subsequently query the visitor profiles to obtain reports or other information about visitors to a content site.

In some embodiments, as shown, the visitor processing system 132 may include a dynamic segmentation system 138 that enables dynamic segmentation of visitors into "audiences" or other groups. For example, the dynamic segmentation system 138 can analyze attribute data associated with multiple visitor systems 102, such as profile data regarding users of the multiple visitor systems 102, interactions or other events associated content from one or more site servers 110, etc. Illustratively, the attribute data or portions thereof may be obtained by code or other objects from a content object server 140. Based on the analysis of the attribute data, the dynamic segmentation system 138 can identify "audiences" or other groups of visitor systems 102 or users thereof. Moreover, the dynamic segmentation system 138 can dynamically change the identified audiences based on input from collection management user systems 104, as described in greater detail below.

The collection configuration management system 134 can be used to manage the one or more monitoring objects associated with the content pages stored in the content pages storage 112 or the content objects stored in the content objects storage 142. For instance, the collection configuration management system 134 can provide functionality for collection management users to select which monitoring objects to associate with which one or more content pages or one or more content objects for a variety of vendor-specific processing purposes or customize the monitoring objects for particular content pages or content objects. These purposes can include obtaining analytics for data analysis or business intelligence, tracking affiliate activity with respect to a content site, obtaining user data for displaying targeted ads, obtaining user data for customizing search functionality or email campaigns targeted to the end users, obtaining user data for personalizing content of a content page, obtaining user data for integration with social networking functionality, obtaining user data for big data analysis, combinations of the same, or the like. Data collected by the monitoring object bundle or monitoring objects can be provided to the collection vendor systems 150, which can perform any of this vendor-specific processing. The data collected or related data may additionally or alternatively be passed to the collection vendor systems 150 through the site server 110, the collection control server 120, or the analytics system 130. In some embodiments, the collection configuration management system 134 can include a publish engine that generates or revises monitoring objects bundles, monitoring objects, or monitoring object containers.

A collection management user system 104 can access the collection control server 120 or the analytics system 130 via the network 108. Like the visitor system 102, the collection management user system 104 can include a browser 105 or other application software that can access network applications over the network 108. The collection management user system 104 can also be any type of computing device including, but not limited to, a desktop, laptop, tablet, smartphone, or the like. The collection management user system 104 can be operated by collection management users such as marketing professionals, website operators, business users, operators of a content site or the site server 110, or any other individual who uses monitoring object bundles or monitoring objects or data obtained therefrom. Collection management users are not the end users of a content site in certain embodiments. The collection management users can use the collection management user system 104 to dynamically update the types of data tracked or analyzed for different visitors of a content site. In addition, the collection management user can use the collection management user system 104 to customize monitoring object bundles or monitoring objects for particular content pages or content objects.

The computing environment 100 can additionally include more end user systems and collection management user systems than just the visitor system 102 and the collection management user system 104 shown in FIG. 1. Multiple end user systems can thus, for instance, access content pages from the site server 110 via the network 108, and multiple collection management user systems can interact with the analytics system 130 via the network 108.

Example Attribute Creation

Figure 2:
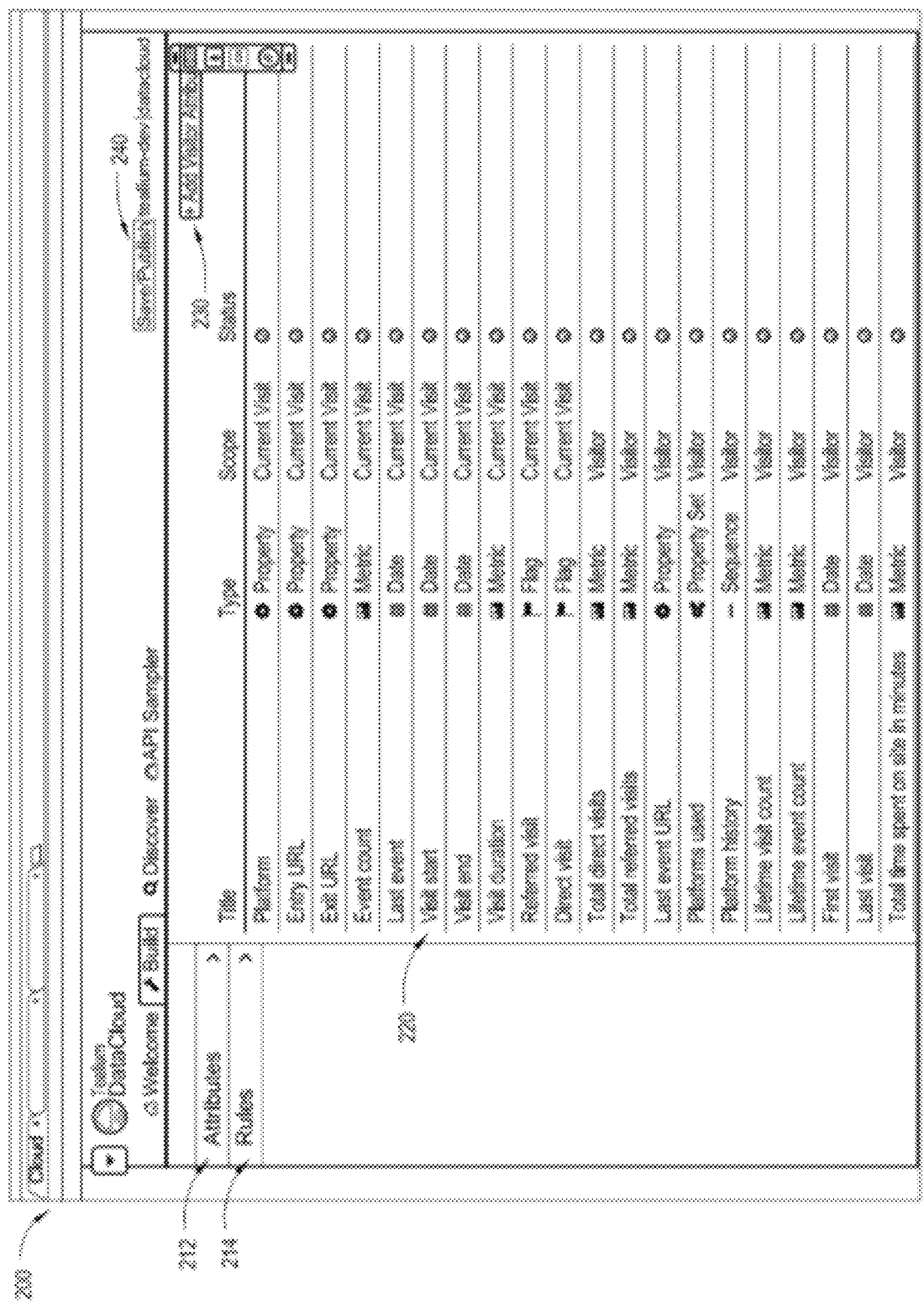
FIG. 2 is a diagram of an illustrative user interface for managing user and interaction attributes according to some embodiments.

FIG. 2 illustrates a user interface 200 that may be used to view and manage attributes. In some embodiments, as shown, the user interface 200 includes options for selecting attributes 212 and rules 214. The attributes 212 can be attributes of data entities representing visitors, including events such as visitor interactions with the content site. The attributes may be as simple as flags indicating whether a user has performed a certain interaction with respect to the content site, such as clicking on a link or purchasing a product. Conversely, the attributes may be as complex as a funnel representing a predefined ordered list of events, such as a payment funnel that occurs through a series of clicks or item selection events made by a user.

In the depicted embodiment, the attributes 212 is selected and a plurality of example attributes 220 are shown organized by title, type, and scope. Some examples of these attributes include a "visit start date" that may be set to determine when a user started visiting a website, a "visit end date" that may be used to determine when a visitor ended his visit, a "visit duration," "lifetime visit count," and the like.

The attributes 220 shown can be collected for all end users that visit the content site or a subset thereof. Options may be provided in some embodiments for a marketing user to determine which subset of users will be tracked according to the selected attributes.

The example types of attributes 220 shown include properties, metrics, dates, flags, sequences, and the like. The scope of the attributes can relate to a current visit that a visitor is experiencing with respect to a content site. The current visit can be a current browse session, for instance, with respect to the content site. The current visit may begin when a visitor system 102 initially loads a content page from a site server 110 and may end when the user leaves the content page or is otherwise inactive for a period of time (such as 30 minutes or more). Alternatively, the scope can refer to the visitor instead of the current visit and may therefore correspond to lifetime visits to a content page or content site by the visitor. Other scopes are possible, including a configurable time period such as the past 30 days or the like.

An add visitor attribute button 230 is also shown in the depicted embodiment. The add visitor attribute button 230 may be selected by a user to add a new visitor attribute to the list of attributes 220. Likewise, any of the attributes 220 may be selected by a management user to edit the attribute 220. A save/publish button 240 is also shown in the depicted embodiment. The save/publish button 240 may be selected by a user to publish instructions for collecting information regarding the new attribute.

Network Interactions for Dynamic Segmentation

Figure 3:
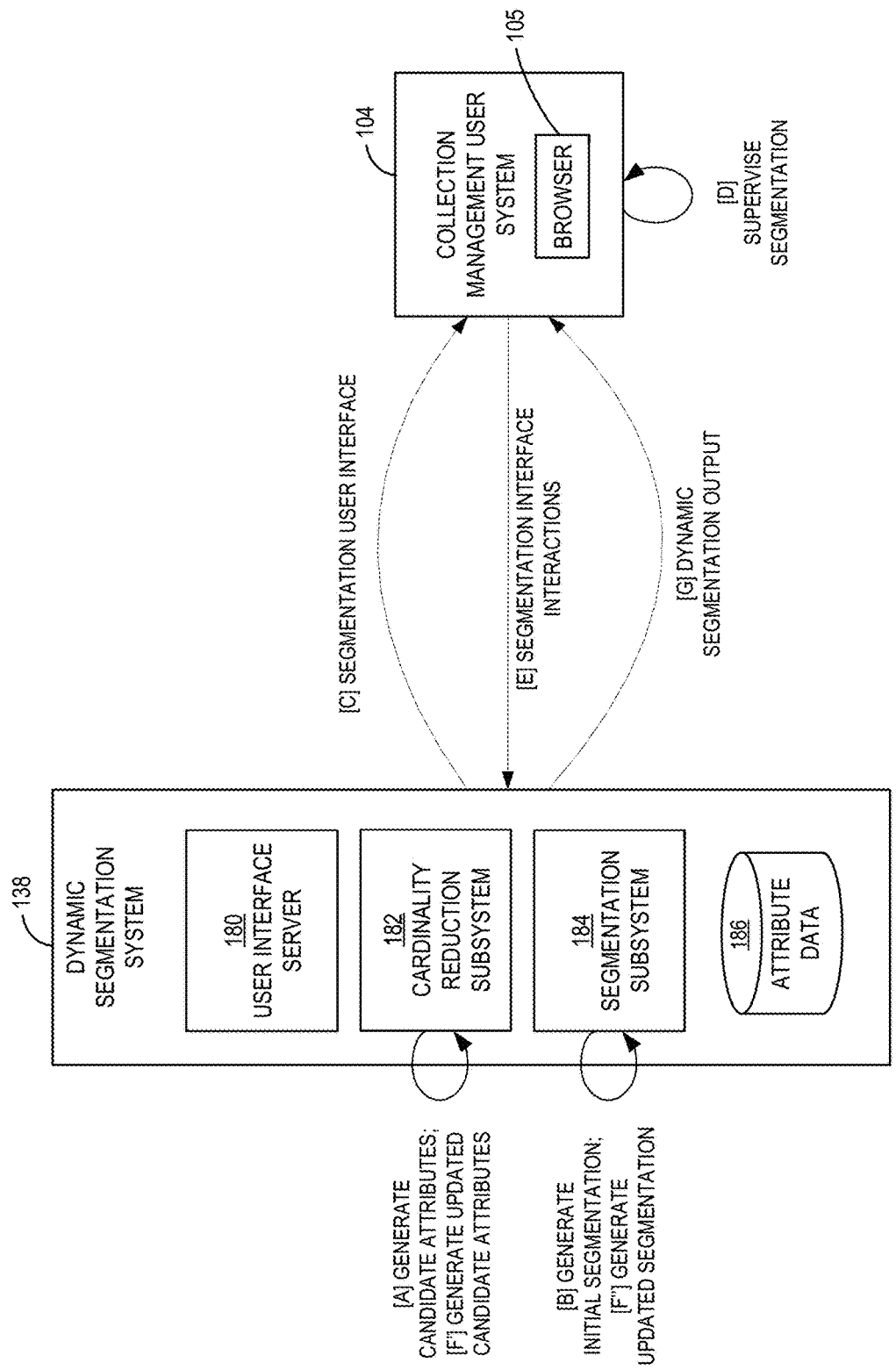
FIG. 3 is a diagram of illustrative data flows and interactions between a dynamic segmentation system and a collection management user system according to some embodiments.

FIG. 3 illustrates an example dynamic segmentation system 138, and interactions between the dynamic segmentation system 138 and a collection management user system 104 during supervised cardinality reduction and supervised segmentation.

As shown, a dynamic segmentation system 138 may include various components and data stores that provide aspects of the functionality disclosed herein. For example, the dynamic segmentation system 138 may include a user interface server 180 for generating user interfaces that display results of cardinality reduction and data entity segmentation, allow a user to supervise aspects of these process, and dynamically present the results of changes to these processes. The dynamic segmentation system 138 may also include a cardinality reduction subsystem 182 to analyze attributes, identify candidate attributes, reduce the cardinality of other attributes to generate additional candidate attributes, exclude attributes from the set of candidate attributes, and apply the results of supervised cardinally reduction operations. The dynamic segmentation system 138 may also include a segmentation subsystem 184 to segment data entities based on candidate attributes and apply the results of supervised segmentation operations. The dynamic segmentation system 138 may also include an attribute data store 186 to store attribute data used in various operations described herein. The example components and data stores of the dynamic segmentation system 138 are illustrative only, and are not intended to be limiting, required, or exhaustive. In some embodiments, the dynamic segmentation system 138 may include additional, fewer, and/or alternative components.

The dynamic segmentation system 138 (or individual components thereof, such as the user interface server 180, cardinality reduction subsystem 182, segmentation subsystem 184, attribute data store 186, etc.) may be implemented on one or more physical server computing devices. In some embodiments, the dynamic segmentation system 138 (or individual components thereof) may be implemented on one or more host devices, such as blade servers, midrange computing devices, mainframe computers, desktop computers, or any other computing device configured to provide computing services and resources. For example, a single host device may execute one or more user interface servers 180, cardinality reduction subsystems 182, segmentation subsystems 184, attribute data stores 186, some combination thereof, etc. The dynamic segmentation system 138 may include any number of such hosts.

In some embodiments, the features and services provided by the dynamic segmentation system 138 may be implemented as web services consumable via one or more communication networks. In further embodiments, the dynamic segmentation system 138 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, the cardinality reduction subsystem 182 may generate a set of candidate attributes at [A], and the segmentation subsystem 184 may generate an initial segmentation of data entities based on candidate attributes at [B]. The user interface server 180 may provide a user interface at [C] to the collection management user system 104. The user interface may be configured to allow the collection management user system 104 to supervise the cardinality reduction and/or segmentation of data entities at [D]. Commands and other interactions by the collection management user system 104 may cause user interface instructions to be sent to the dynamic segmentation system at [E]. In response to the instructions, the cardinality reduction subsystem 182 may generate updated candidate attributes with adjusted cardinality at [F'] and/or the segmentation subsystem may generate updated segmentation at [F"]. A user interface for presenting and interacting with dynamically-modified attribute cardinality and/or segmentation out may be sent to the collection management user system 104 at [G]. Operations [D]-[G] may be repeated, as needed, until desired segmentation output is achieved.

Figure 4:
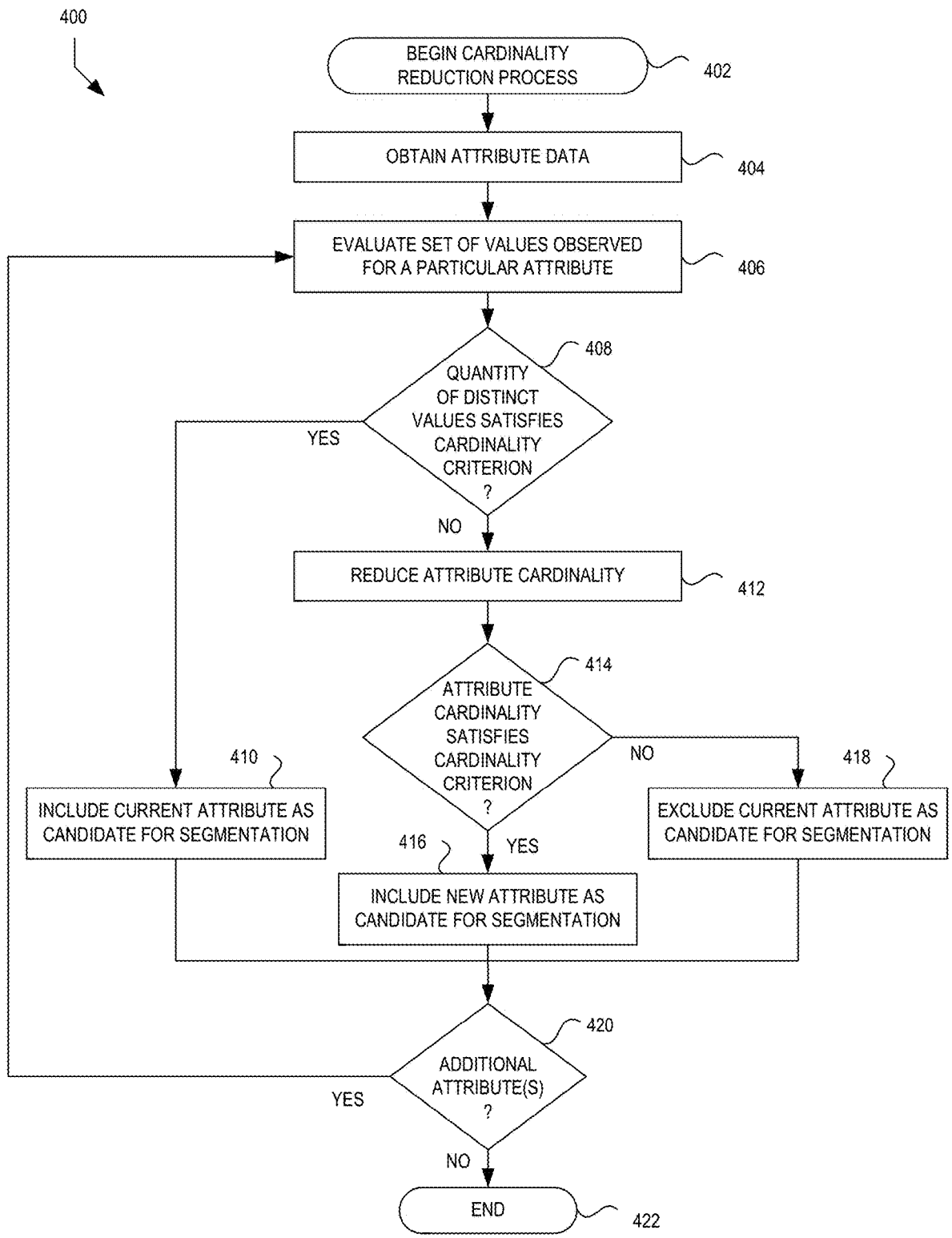
FIG. 4 is a flow diagram of an illustrative process for attribute cardinality reduction and identification of candidate attributes according to some embodiments.
Figure 6:
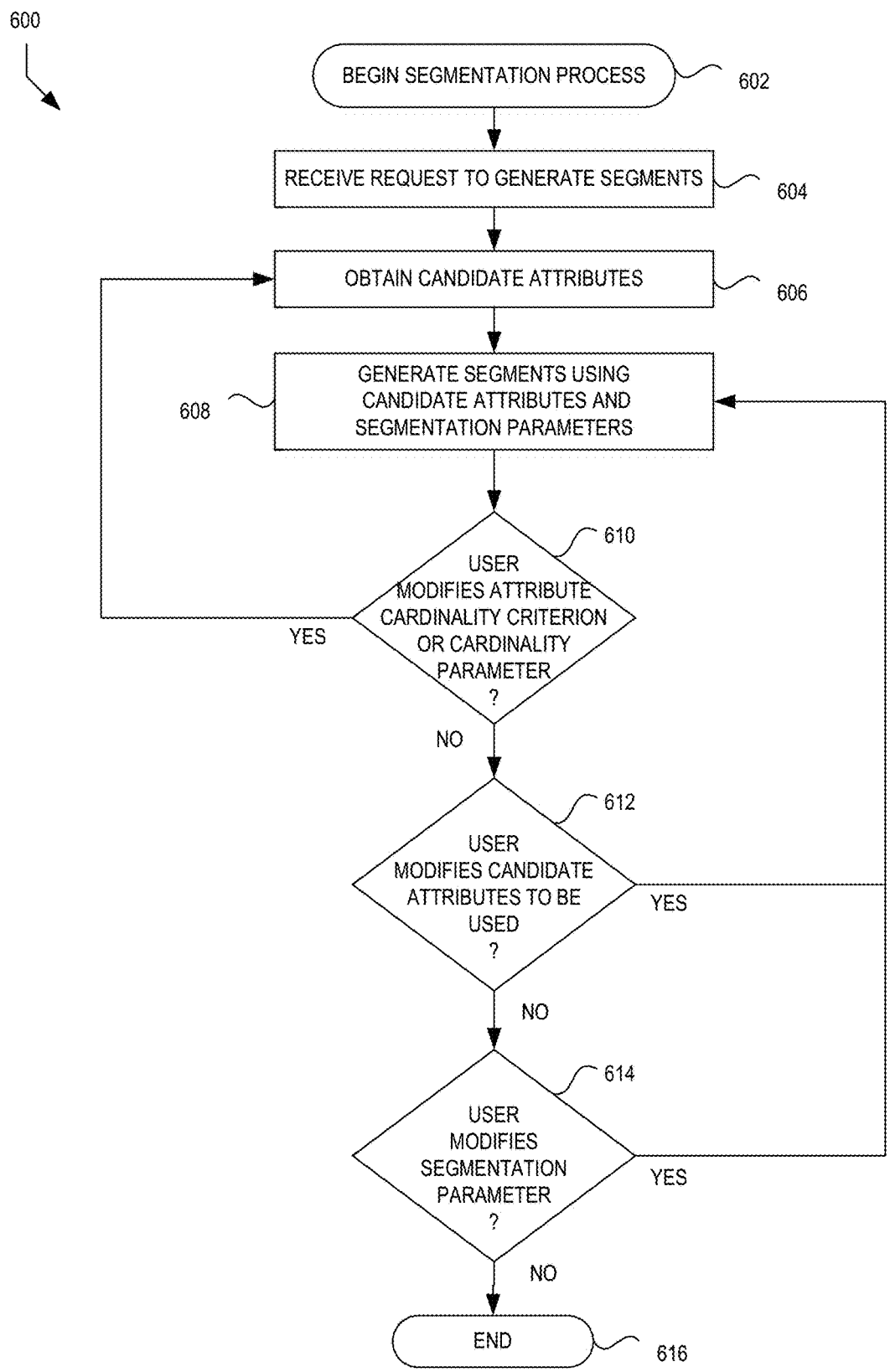
FIG. 6 is a flow diagram of an illustrative process for dynamic segmentation based on attributes according to some embodiments.

Example routines for supervised cardinality reduction and supervised segmentation are shown in FIGS. 4 and 6, respectively, and described in greater detail below.

Cardinality Reduction and Candidate Attribute Generation

FIG. 4 is a flow diagram of an illustrative process 400 that may be executed by the cardinality reduction subsystem 182 or some other component of the dynamic segmentation system 138 to manage cardinality reduction for attributes. Portions of the process 400 will be described with further reference to the illustrative attributes and values shown in FIG. 5.

The process 400 begins at block 402. The process 400 may begin in response to an event, such as when the dynamic segmentation system 138 receives a request to segment data entities, during the process of dynamic segmentation of data entities, when a user modifies a cardinality criterion or parameter, or in response to some other event. When the process 400 is initiated, a set of executable program instructions stored on one or more non-transitory computer-readable media (e.g., hard drive, flash memory, removable media, etc.) may be loaded into memory (e.g., random access memory or "RAM") of a computing device, such as one or more servers 970 shown in FIG. 9 and described in greater detail below. In some embodiments, the process 400 or portions thereof may be implemented on multiple processors, serially or in parallel.

At block 404, the cardinality reduction subsystem 182 or some other component of the dynamic segmentation system 138 can obtain attribute data. In some embodiments, the attribute data may be obtained from the attribute data store 186, or from some other data store. The attribute data may represent attribute values for a collection of data entities to be segmented into subsets. For example, the data entities may correspond to visitors to a content site, such as a site hosted by a site server 110. The data entities may comprise or otherwise be associated with sets of attributes representing aspects of the visitors, interactions of the visitors with the content site, etc. Examples of such attributes are shown in FIG. 2. Obtaining the attribute data may include obtaining attribute data for each of the data entities in the collection to be segments, or for a subset thereof.

At block 406, the cardinality reduction subsystem 182 or some other component of the dynamic segmentation system 138 can evaluate, for a particular attribute, the set of values that have been observed or are possible. In the description that follows, the particular attribute for which values are being evaluated is referred to as the "current attribute." As described in further detail below, portions of the process 400 may be repeated for other attributes serially, or asynchronously.

In some embodiments, the evaluation of the current attribute may be an evaluation of the quantity of distinct values observed for the attribute across the collection of data entities (or some subset thereof). For example, the cardinality reduction subsystem 182 may iterate through each value observed for the attribute and maintain a count of the quantity distinct values observed, and some distinct values may be observed multiple times. In other embodiments, the evaluation of the current attribute may be an evaluation of the quantity of distinct values that are permitted or possible for the attribute. For example, the cardinality reduction subsystem 182 may obtain data defining the attribute and it's permitted range of values. From this data, the cardinality reduction subsystem 182 may calculate the quantity of distinct values permitted, or determine that the quantity of distinct values is potentially infinite.

Figure 5:
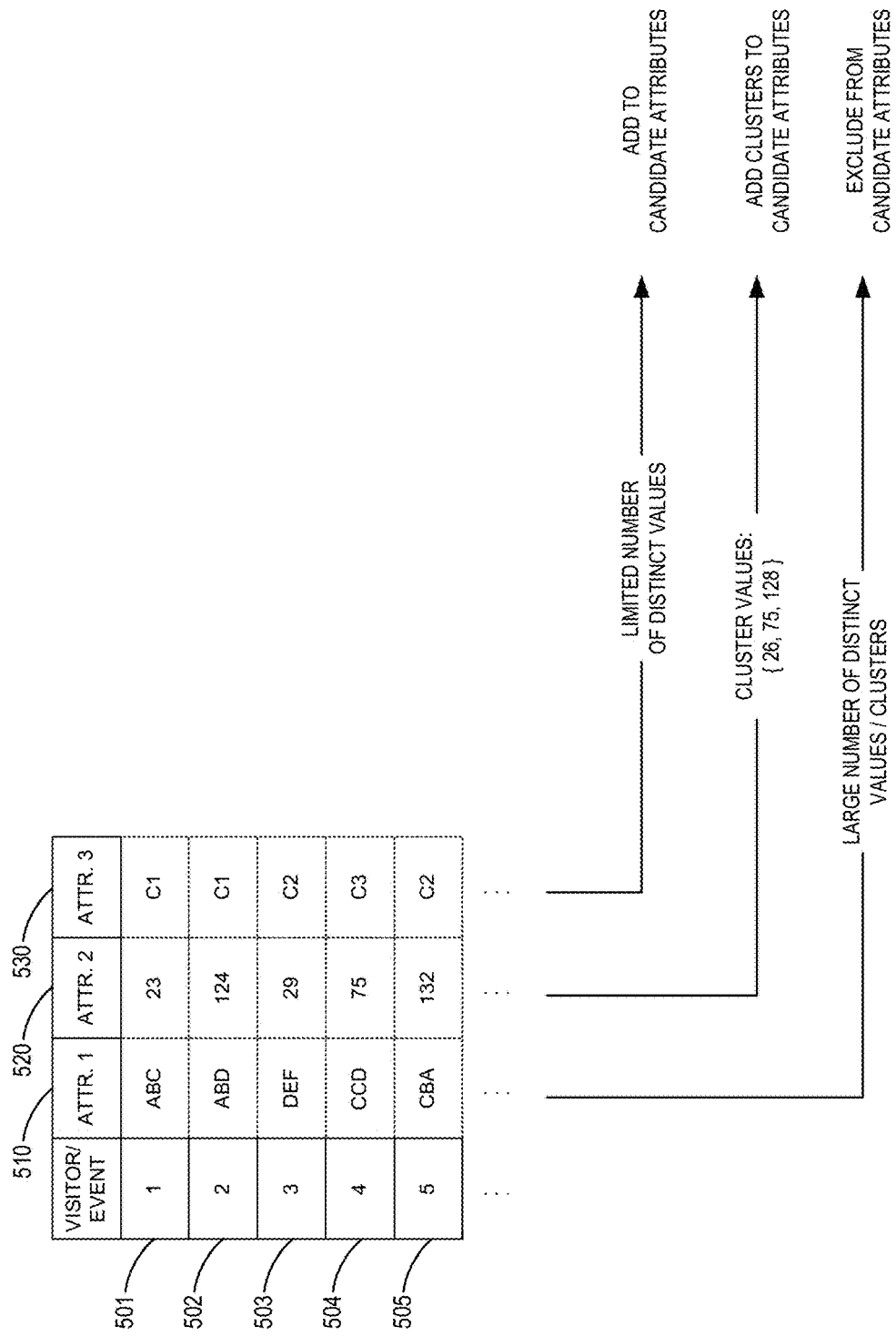
FIG. 5 is a diagram of an illustrative reduction of cardinality and identification of candidate attributes according to some embodiments.

FIG. 5 shows several example attributes, and their corresponding values for several data entities. As shown, the data entities 501, 502, 503, 504, and 505 each have a set of attribute values for attributes 510, 520, and 520.

Attribute 510 may take discrete values, and exhibits a large and potentially infinite range of distinct values for the data entities. Indeed, none of the data entities shown has the same value for the attribute 510. For example, attribute 510 may be a name attribute, a unique identifier attribute, or some other attribute in which it is unlikely or designed to be impossible for multiple data entities to have the same value. The cardinality reduction subsystem 182 may make this evaluation based on an analysis of the observed values for the attribute 510 and/or a definition of the attribute 510.

Attribute 520 may take any of a range of continuous values, and exhibits a large and potentially infinite range of distinct values for the data entities. Indeed, none of the data entities has the same value for the attribute 520. For example, attribute 520 may be a metric attribute or some other amount attribute, such as an attribute for an amount spent on a content site, a measurement of time viewing on a content site, or the like. In this case, it may be possible, even if unlikely, that multiple data entities to have the same value. However, it may be somewhat more likely that multiple data entities will have similar values for this attribute 520, and those similarities may be meaningful. The cardinality reduction subsystem 182 may make this evaluation based on an analysis of the observed values for the attribute 520 and/or a definition of the attribute 520.

Attribute 530 may take discrete values, and exhibits a finite and potentially small range of distinct values for the data entities. Indeed, data entities 501 and 502 have the same value for attribute 530, and data entities 503 and 505 have the same value for the attribute 530 (though different than the value for data entities 501 and 502). For example, attribute 530 may be a classification attribute, such as a demographic attribute, an attribute indicating a membership level, or the like. In this case, it may be possible, and potentially likely, that data entities can be effectively and meaningfully segmented based at least partly on the value of attribute 530. The cardinality reduction subsystem 182 may make this evaluation based on an analysis of the observed values for the attribute 530 and/or a definition of the attribute 530.

At decision block 408, the cardinality reduction subsystem 182 or some other component of the dynamic segmentation system 138 can determine whether one or more cardinality criteria are satisfied. A cardinality criterion may be used to identify those attributes for which data entities may share the same or similar values, or which are otherwise candidates for effective and meaningful segregation of data entities into segments. For example, a cardinality criterion may relate to whether the quantity of distinct values for the current attribute satisfies a cardinality criterion.

In some embodiments, the cardinality criterion may relate to a threshold. For example, there may be a maximum threshold quantity of distinct values for a given attribute. If an attribute has a quantity of distinct values (e.g., observed in data entity analysis or possible as specified by an attribute definition) that exceeds the maximum threshold, then the attribute may not be a candidate attribute for segmentation. If the attribute has a quantity of distinct values that does not exceed the threshold, then the attribute may be a candidate attribute for segmentation. As another example, there may be a minimum threshold quantity of distinct values for a given attribute. If an attribute has a quantity of distinct values that fails to meet the minimum threshold, then the attribute may not be a candidate attribute for segmentation. If the attribute has a quantity of distinct values that does meet the minimum threshold, then the attribute may be a candidate attribute for segmentation.

In some embodiments, the cardinality criterion may relate to a range between thresholds. For example, there may be both a minimum threshold quantity and a maximum threshold quantity of distinct values for a given attribute. If an attribute has a quantity of distinct values outside of these thresholds (e.g., either greater than the maximum threshold or less than the minimum threshold), the attribute may not be a candidate attribute for segmentation. If the attribute has a quantity of distinct values within these thresholds (both less than the maximum threshold and greater than the minimum threshold), then the attribute may be a candidate attribute for segmentation.

The example cardinality criterion described herein are illustratively only, and are not intended to be limiting, required, or exhaustive. In some embodiments, an additional and/or alternative criterion may be used.

If the one or more cardinality criteria are satisfied, then the process 400 may proceed to block 410, where the current attribute is added to a set of candidate attributes for use in segmentation of the data entities. Otherwise, if the one or more cardinality criteria are not satisfied, then the process 400 may proceed to block 412.

At block 412, the cardinality reduction subsystem 182 or some other component of the dynamic segmentation system 138 can perform one or more operations to reduce the cardinality of the current attribute.

In some embodiments, reducing the cardinality of the current attribute may be performed by identifying similar values of the attribute and grouping the similar values into attribute value subsets to produce an attribute with a set of grouped values instead of individual values. In some embodiments, reducing the cardinality of the current attribute may be performed by quantizing the values of the attribute (e.g., rounding values to the nearest whole number or predetermined decimal, truncating digits, etc.) to produce an attribute with discrete values instead of continuous values. The example cardinality reduction operations described herein are illustratively only, and are not intended to be limiting, required, or exhaustive. In some embodiments, an additional and/or alternative operation may be used.

In the examples shown in FIG. 5, values for attribute 520 may be grouped such that a relatively small number of groups can cover most or all of the observed and/or possible values for the attribute. In some embodiments, a single variable clustering algorithm may be used to determine which values can be grouped, and the overall number and makeup of the groups. In the example shown in FIG. 5. the values observed for attribute 520 may be grouped into a smaller number of clusters, with a particular value representing an average or center point.

As another example, values for attribute 510 may not be grouped such that a relatively small number of groups can cover most or all of the observed and/or possible values for the attribute. Due to the nature of the attribute and its observed values, any grouping may be arbitrary.

At decision block 414, the cardinality reduction subsystem 182 or some other component of the dynamic segmentation system 138 can determine whether the cardinality of the current attribute (or an attribute generated therefrom) satisfies one or more cardinality criteria. In some embodiments, the cardinality criteria may be the same as, or similar to, those described above with respect to decision block 408. For example, a cardinality criterion may relate to whether the quantity of distinct groups for the current attribute satisfies a cardinality criterion. The one or more cardinality criteria may relate to one or more thresholds, such as a minimum and/or a maximum threshold.

In the examples shown in FIG. 5, the groups of values generated for attribute 520 may satisfy the one or more cardinality criteria. For example, the values of attribute 520 may be capable of being grouped into or otherwise summarized by a smaller number of groups, and the number of groups may satisfy the one or cardinality criteria. Moreover, the grouping of values may be meaningful, because the values are numeric and the groups include values that are close numerically. In this case, the process 400 may proceed to block 416, where an attribute derived from attribute 520 is added to the candidate attributes for segmentation.

In contrast, any groups of values generated for attribute 510 may not satisfy the one or more cardinality criteria. For example, the values of attribute 510 may be not be capable of being grouped into or otherwise summarized by a smaller number of groups, because the number of groupings may be too large or may not be meaningful (e.g., the values are not numeric and do not have inherent similarity in meaning even when similar in representation). In this case, the process 400 may proceed to block 418, where attribute 510 is excluded from the candidate attributes for segmentation.

At decision block 420, the cardinality reduction subsystem 182 or some other component of the dynamic segmentation system 138 can determine whether there are any additional attributes to consider for potential addition to the group of candidate attributes for segmentation. If so, the process 400 may return to block 406. Otherwise, the process 400 may terminate at block 422.

Dynamic Segmentation

FIG. 6 is a flow diagram of an illustrative process 600 that may be executed by the segmentation subsystem 184 or some other component of the dynamic segmentation system 138 to manage dynamic segmentation of data entities based on candidate attributes. Portions of the process 600 will be described with further reference to the example user interfaces shown in FIGS. 7 and 8. Illustratively, the user interfaces shown in FIGS. 7 and 8 may be provided in the form of content pages, such as HTML pages with instructions for presenting the user interfaces, or mobile application interfaces.

The process 600 begins at block 602. The process 600 may begin in response to an event, such as when the dynamic segmentation system 138 begins operation, receives a request to segment data entities, or in response to some other event. When the process 600 is initiated, a set of executable program instructions stored on one or more non-transitory computer-readable media (e.g., hard drive, flash memory, removable media, etc.) may be loaded into memory (e.g., random access memory or "RAM") of a computing device, such as one or more servers 970 shown in FIG. 9 and described in greater detail below. In some embodiments, the process 600 or portions thereof may be implemented on multiple processors, serially or in parallel.

At block 604, the segmentation subsystem 184 or some other component of the dynamic segmentation system 138 can receive a request to segment a collection of data entities. In some embodiments, the request may be received from a collection management user system 104. For example, a user of the collection management user system 104 may launch a browser 105 or other application and connect to the user interface server 180. The user may desire to segment data entities for a particular site server 110, such as data entities representing visitors to a content site hosted by the site server 110. In this case, such segments may be referred to as visitor data entity segments, and the different segments may also or alternatively be referred to as audiences. The user may submit a request to the user interface server 180, and the user interface server 180 may request the segmentation subsystem 184 to segment the respective collection of data entities.

At block 606, the segmentation subsystem 184 or some other component of the dynamic segmentation system 138 can obtain candidate attributes for use in segmenting the collection of data entities. In some embodiments, to obtain the candidate attributes, the cardinality reduction subsystem 182 or some other module or component of the dynamic segmentation system 138 may be employed. For example, the cardinality reduction subsystem 182 may execute the process shown in FIG. 4 and described above to generate a set of candidate attributes.

At block 608, the segmentation subsystem 184 or some other component of the dynamic segmentation system 138 can generate or otherwise identify segments of the collection of data entities based on one or more of the candidate attributes. In some embodiments, segmenting the collection of data entities may be based on clustering data entities according to similarities in candidate attribute values. For example, clustering the data entities may involve using a machine learning process or other statistical method, such as density-based spatial clustering of applications with noise ("DBSCAN"), k-means clustering, mean-shift clustering, expectation-maximization clustering using Gaussian mixture models, agglomerative hierarchical clustering, or other clustering algorithms.

In some embodiments, an initial segmentation of the data entity collection may be involve executing a clustering algorithm using each of the candidate attributes. For example, if there are three candidate attributes generated by the cardinality reduction subsystem 182, the segmentation subsystem 184 may execute a clustering algorithm using three values for each data entity (e.g., clustering in three-dimensional space).

In some embodiments, an initial segmentation may be based on a subset of fewer than all of the candidate attributes. For example, the segmentation subsystem 184 may begin with a predetermined number of candidate attributes, such as one or two. As another example, the segmentation subsystem 184 may begin with a dynamically-determined number of candidate attributes, such as by determining a percentage of candidate attributes (e.g., half of the candidate attributes) or by determining a quantity of candidate attributes (n−1 candidate attributes, where n is the number of candidate attributes). When using a subset, the candidate attributes may be randomly selected, or may be selected based on a measurement of the degree to which the attributes can be used to discriminate between data entities (e.g., the number of distinct attribute values, the proportion of data entities with a given attribute value, etc.).

Figure 7:
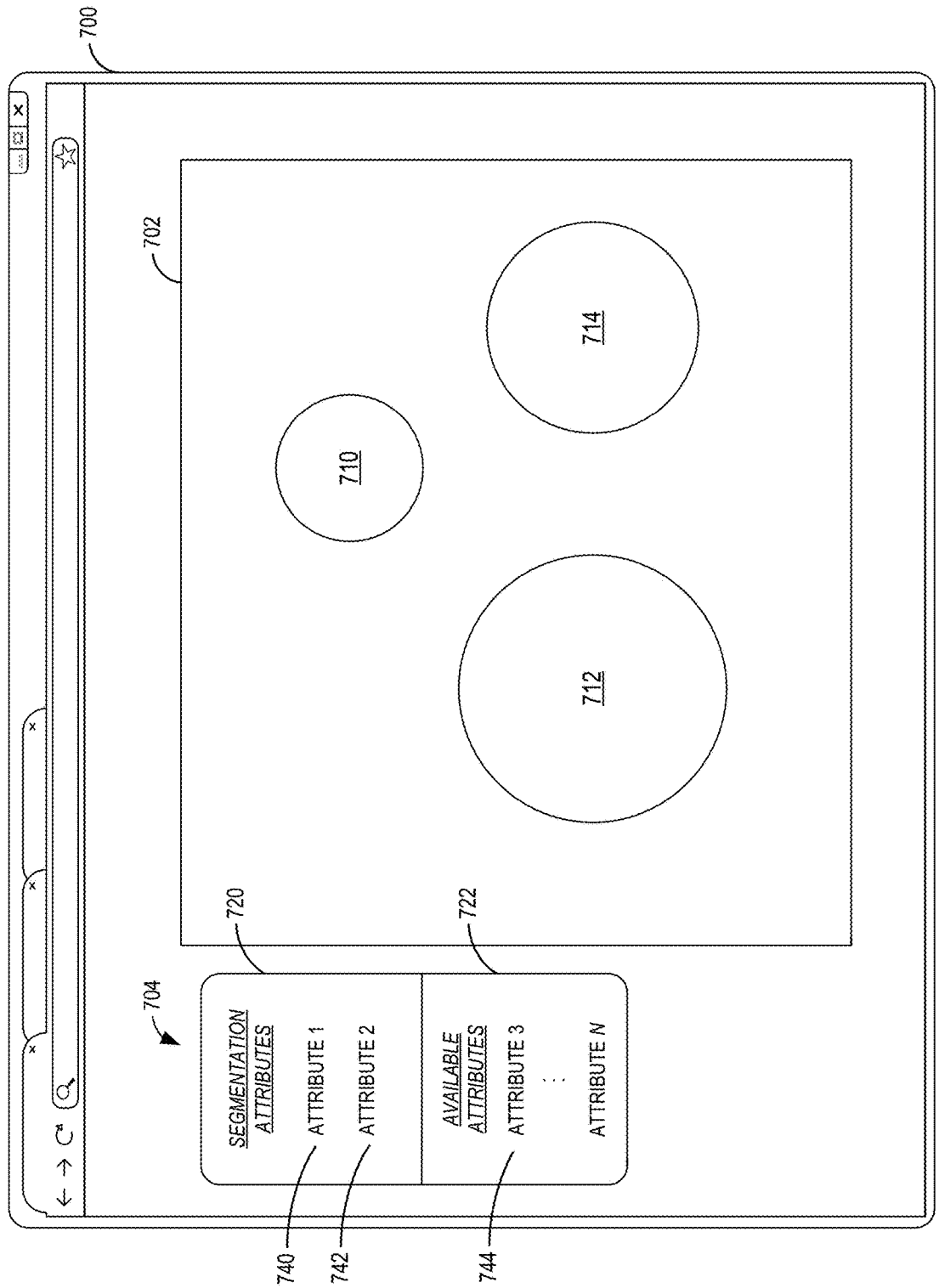
FIG. 7 is a diagram of an illustrative user interface for interacting with dynamically-segmented data according to some embodiments.

The user interface server 180 may generate a segmentation user interface that represents the initial segmentation of the data entity collection. FIG. 7 illustrates an example of an interface 700 that includes a segmentation area 702 to present a visualization of the initial segmentation of the data entity collection. As shown, the data entity collection is segmented into three segments 710, 712, and 714, represented by display objects presented on the user interface. The interface 700 includes an attribute area 704 to present information about the candidate attributes. For example, the attribute area 704 includes a first portion 720 that displays the candidate attributes used generate the segments shown in the segmentation area 702, and a second portion 722 that displays any unused candidate attributes. The interface 700 may be interactive, allowing users to adjust various aspects of the cardinality reduction and/or segmentation process. For example, a user can select or otherwise active portions of the user interface 700, which may cause transmission of a message (e.g., a Hypertext Transfer Protocol or "HTTP" request or post message) to the dynamic segmentation system 138.

At decision block 610, the segmentation subsystem 184 or some other component of the dynamic segmentation system 138 can determine whether a user has modified an attribute cardinality criterion or cardinality parameter. In some embodiments, the attribute area 704 may allow a user to specify a change to a cardinality criterion and/or cardinality parameter in order to supervise the process of cardinality reduction. For example, the user may specify a desired or target degree of cardinality for a candidate attribute, such as by selecting or entering a different number of groups of attribute values for generated attributes (e.g., attributes generated to represent other attributes having a high degree of cardinality. As another example, the user may select different coverage targets for such generated attributes, such as by specifying a confidence interval, a percentage of values for a particular attribute that are to be within a particular number of standard deviations of a mean for an attribute value group, etc. The user interface server 180 may receive interaction data representing these user interactions with the attribute area 704 or other portions of the interface 700.

If the user has modified an attribute cardinality criterion or cardinality parameter, the process 600 can return to block 606, where candidate attributes are processed based on the user-specified modification to generate a modified set of candidate attributes. Otherwise, if the user has not modified an attribute cardinality criterion or cardinality parameter, the process 600 may proceed to decision block 612.

At decision block 612, the segmentation subsystem 184 or some other component of the dynamic segmentation system 138 can determine whether a user has modified candidate attributes to be used for the segmentation of data entities. In some embodiments, the attribute area 704 may allow a user to change the attributes that are to be used to segment the data entity collection. A user may add one or more attributes to the set of attributes used to segment the data entity collection. For example, the user may select an attribute from the second portion 722 of the attribute area 704 that displays candidate attributes not used in the current segmentation of the data entity collection. A user may also or alternatively remove one or more attributes from the set of attributes used to segment the data entity collection. For example, the user may select an attribute from the first portion 720 of the attribute area 704 that displays candidate attributes used in the current segmentation of the data entity collection. The user interface server 180 may receive interaction data representing these user interactions with the attribute area 704 or other portions of the interface 700.

Figure 8:
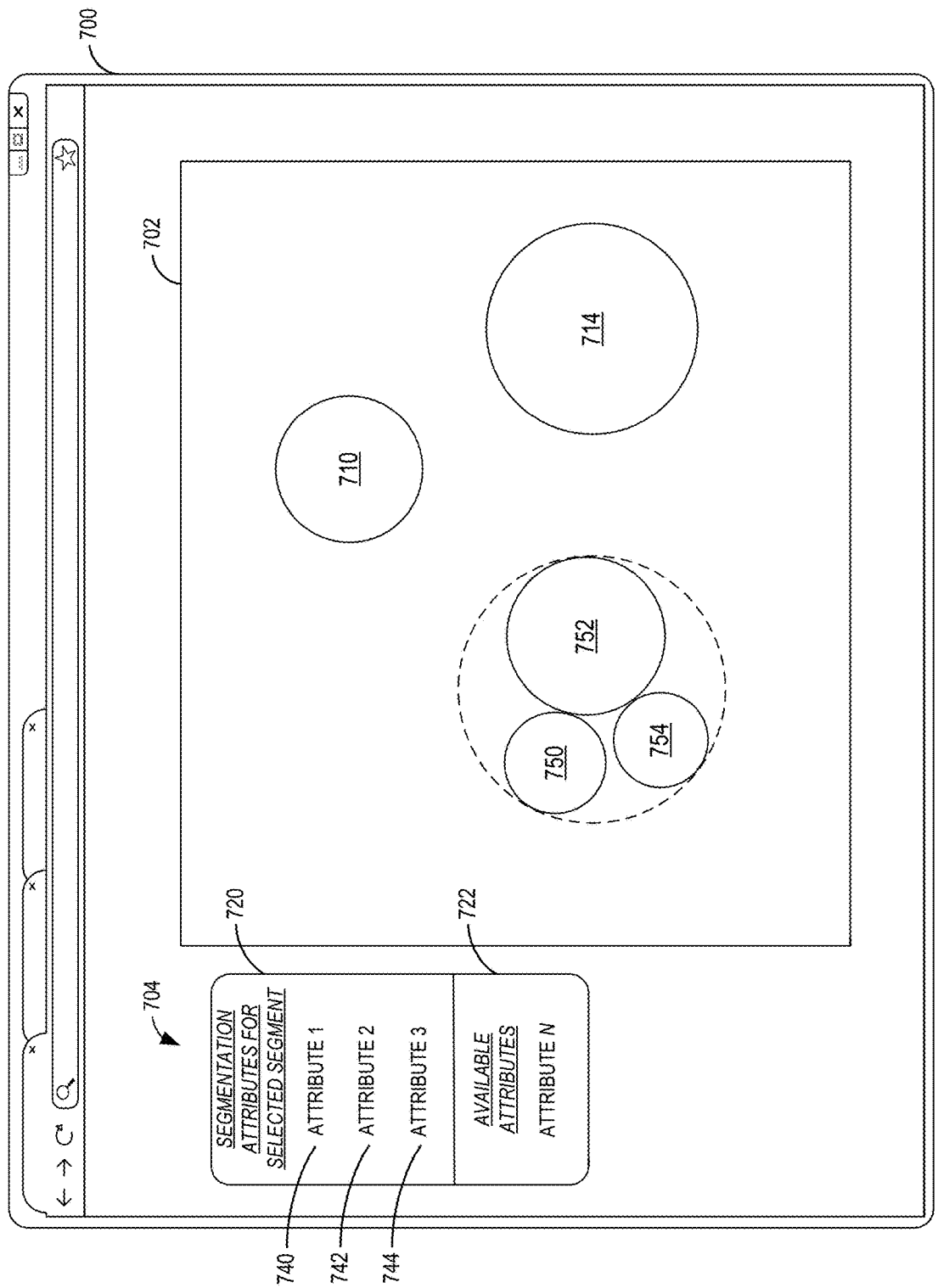
FIG. 8 is a diagram of an illustrative user interface for interacting with dynamically-segmented data according to some embodiments.

In some embodiments, the attribute area 704 may allow a user to change the attributes that are to be used determine a particular segment of data entity collection. A user may select a particular segment, such as segment 710, 712, or 714. The user may then add, remove, and/or substitute one or more attributes for the selected segment only. For example, attributes 740 and 742 may be used to generate a segmentation of the data entity collection shown in segmentation area 702. The user may wish to further refine a segment, such as segment 712. To do so, the user may select available attribute 744. As shown in FIG. 8, addition of attribute 744 can cause the segmentation process to be performed again for just the data entities in selected segment 712, resulting in one or more subsegments 750, 752, 754 of data entities that are each in segment 712 based on attributes 740 and 742, but are in distinct subsegments once attribute 744 is considered. An updated segmentation user interface shown in FIG. 8 (e.g., an updated content page, such as an HTML page) may then be generated and provided.

If the user has modified candidate attributes to be used in segmenting the data entity collection and/or refining a particular segment thereof, the process 600 can return to block 608, where the data entity collection is segmented using the selected set of candidate attributes. Otherwise, if the user has not modified candidate attributes, the process 600 may proceed to decision block 614.

At decision block 614, the segmentation subsystem 184 or some other component of the dynamic segmentation system 138 can determine whether a user has modified a different parameter of the dynamic segmentation process other than those described above. In some embodiments, the interface 700 may allow a user to specify a change to a segmentation parameter in order to supervise the process of data entity segmentation. For example, the user may select different coverage targets for segments, such as by specifying a confidence interval, a percentage of data entities that are to be within a particular number of standard deviations of a mean for a segment, etc. The user interface server 180 may receive interaction data representing these user interactions with the interface 700.

If the user has modified one or more segmentation parameters to be used in segmenting the data entity collection, the process 600 can return to block 608, where the data entity collection is segmented using the modified segmentation parameter and the set of candidate attributes. Otherwise, if the user has not modified a segmentation parameter, the process 600 may terminate at block 616.

The result of the process 600 is a segmented data entity collection that is based on analysis of attributes of the data entities rather than pre-determined audience definitions. Moreover, users of the segmented data entity collection that is produced have had the opportunity to supervise the segmentation process and ensure that the resulting segmented data entity collection meets their needs.

The output may be provided to another system for use in further operations. For example, other components of the visitor processing system 132 may use the segmented data entity collection to provide further data analysis services, such as those resulting in content targeting.

Execution Environment

Figure 9:
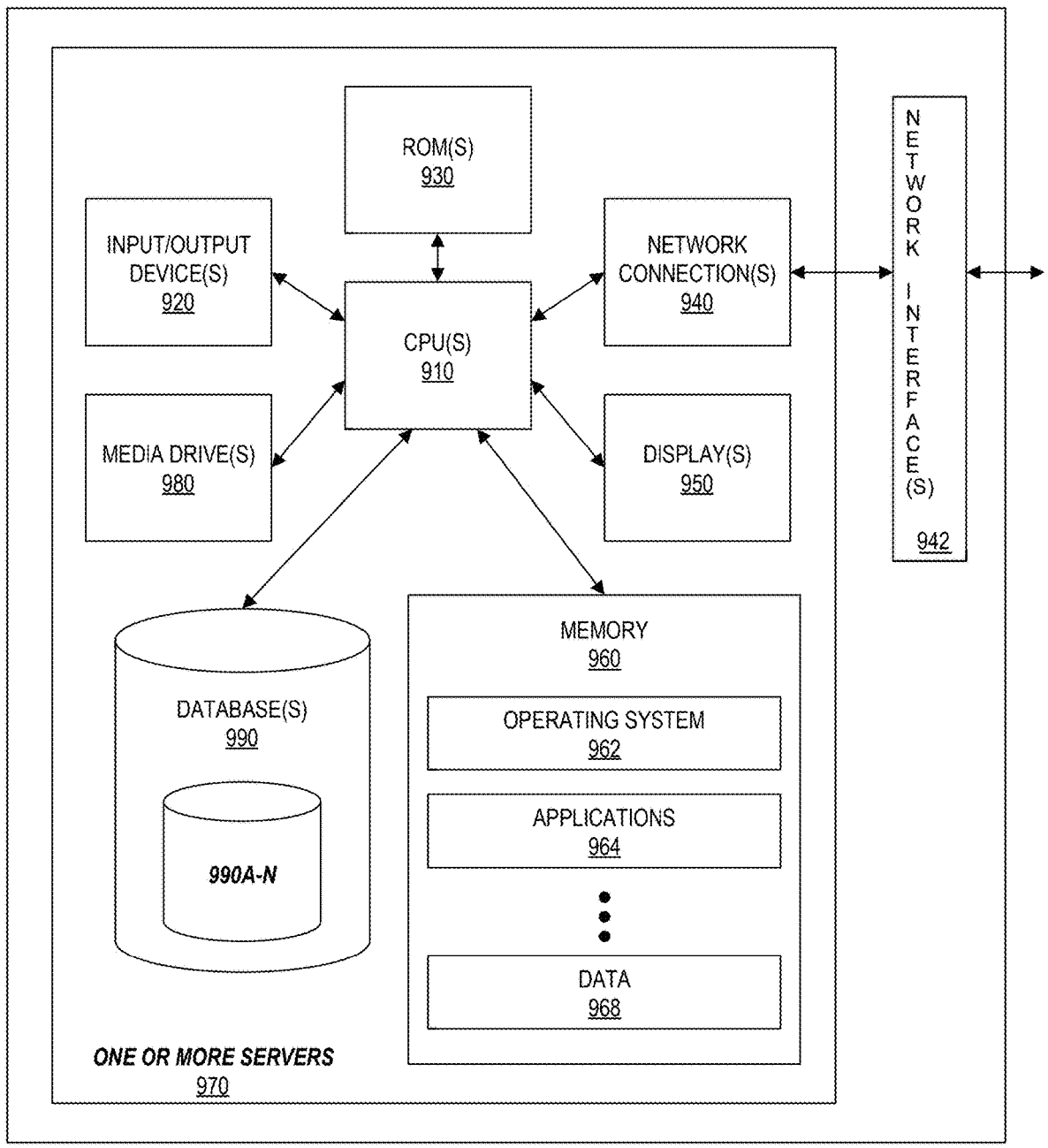
FIG. 9 is a block diagram of an illustrative computing system configured to implement aspects of the present disclosure according to some embodiments.

FIG. 9 illustrates one or more servers 970 usable to construct one or more of the systems (for instance, the visitor system 102, collection management user system 104, analytics system 130, or dynamic segmentation system 138) or servers (for instance, the site server 110, collection control server 120, and content object server 140) within the computing environment 100 of FIG. 1.

As shown in FIG. 9, one or more servers 970 can include (i) one or more processors (CPUs) 910, (ii) an input/output device(s) 920 configured to allow users to input and output information and interact with the one or more servers 970 as well as transfer and receive data, (iii) one or more read only memory (ROMs) devices 930 or equivalents to provide nonvolatile storage of data or programs, (iv) one or more displays 950 such as a computer monitor or other display device, (v) one more network connections 940 and associated network interfaces 942 configured to allow the one or more servers 970 to connect to other systems, servers or portable devices, as well as one or more memory spaces 960 and one or more databases 990. Database(s) 990 may be further divided or distributed as one or more sub-databases 990*a*-990*n*, with the sub-databases storing feature or function specific information associated with a particular feature or function. The various components shown in FIG. 9 may be incorporated in one or more physical servers 970. It is noted that the various components shown in FIG. 9, including database 990, are typically included as part of server(s) 970, however, they may be external to server(s) 970 in some embodiments. For example, database(s) 990 may be external to server(s) 970 and may be part of a separate database server system or networked database system. In some instances, the system may not be a server but rather a computing device like a desktop computer or mobile device.

One or more memory spaces 960 may comprise DRAM, SRAM, FLASH, hard disk drives or other memory storage devices, such as media drives 980, configured to store operating systems 962, application programs or data 964, and one or more memory spaces 960 may be shared with, distributed with or overlap with the memory storage capacity of database 990. In some embodiments, one or more memory spaces 960 may include database 990 or in some embodiments database 990 may include data 968 as shown in memory space 960. Data stored in memory space 960 or database 990 may include information, such as collection configuration management system information or other types of data described herein.

Example Embodiments

Some inventive aspects of the disclosure are set forth in the following clauses:

Clause 1. A system comprising:
computer-readable memory storing executable instructions; and
one or more processors programmed by the executable instructions to at least:
obtain attribute data representing values of an attribute for each of a plurality of visitor data entities, wherein a first visitor data entity of the plurality of visitor data entities represents a first visitor to a content site;
determine that the attribute data fails to satisfy a cardinality criterion;
generate a plurality of attribute value subsets from the attribute data, wherein the plurality of attribute value subsets comprises:
a first attribute value subset associated with a first subset of values represented by the attribute data; and
a second attribute value subset associated with a second subset of values represented by the attribute data;
determine that the plurality of attribute value subsets satisfies the cardinality criterion;
generate a plurality of visitor data entity segments using the plurality of attribute value subsets and the plurality of visitor data entities, wherein a first visitor data entity segment of the plurality of visitor data entity segments comprises visitor data entities associated with a first attribute value subset of the plurality of attribute value subsets, and wherein a second visitor data entity segment of the plurality of visitor data entity segments comprises visitor data entities associated with a second attribute value subset of the plurality of attribute value subsets; and
generate a user interface using the plurality of visitor data entity segments, wherein the user interface enables a user to initiate at least one of: modification of a cardinality of the attribute, or modification of the plurality of visitor data entity segments.

Clause 2. The system of clause 1, wherein first attribute data for the first visitor data entity comprises data generated during a visit of the first visitor to the content site.

Clause 3. The system of clause 1, wherein the one or more processors programmed to determine that the attribute data fails to satisfy the cardinality criterion are programmed by further executable instructions to determine that a quantity of distinct values represented by the attribute data fails to satisfies a threshold.

Clause 4. The system of clause 3, wherein the threshold comprises a maximum threshold.

Clause 5. The system of clause 3, wherein the threshold comprises a minimum threshold.

Clause 6. The system of clause 1, wherein the one or more processors programmed to generate the plurality of attribute value subsets are programmed by further executable instructions to execute a clustering algorithm.

Clause 7. The system of clause 1, wherein the one or more processors programmed to generate the plurality of attribute value subsets are programmed by further executable instructions to generate a set of discrete values, wherein individual discrete values are associated with a portion of continuous values represented by the attribute data.

Clause 8. The system of clause 1, wherein the one or more processors are programmed by further executable instructions to:
receive interaction data representing a modification to a cardinality parameter associated with the attribute; and
generate a second plurality of attribute value subsets from the attribute data, wherein the second plurality of attribute value subsets is generated based on the modification to the cardinality parameter.

Clause 9. The system of clause 1, wherein the one or more processors are programmed by further executable instructions to:
receive interaction data representing a selection of a second attribute from a set of candidate attributes; and
generate a second plurality of visitor data entity segments from the plurality of visitor data entities, wherein the second plurality of visitor data entity segments is generated based on the second attribute.

Clause 10. The system of clause 1, wherein the one or more processors are programmed by further executable instructions to:
receive interaction data representing a modification to a segmentation parameter associated generating the plurality of visitor data entity segments; and
generate a second plurality of visitor data entity segments from the plurality of visitor data entities, wherein the second plurality of visitor data entity segments is generated based on the modification to the segmentation parameter.

Clause 11. The system of clause 1, wherein the one or more processors are programmed by further executable instructions to generate content targeting data based on the first visitor data entity segment.

Clause 12. A computer-implemented method comprising:
under control of a computing system comprising one or more processors configured to execute specific instructions,
obtaining first attribute data representing values of a first attribute for each of a plurality of data entities;
determining that the first attribute data satisfies a cardinality criterion;
adding the first attribute to a set of candidate attributes;
obtaining second attribute data representing values of a second attribute for each of the plurality of data entities;
determining that the second attribute data fails to satisfy the cardinality criterion;
generating third attribute data representing values of a third attribute, wherein the third attribute corresponds to the second attribute with a reduced degree of cardinality;
determining that the third attribute data satisfies the cardinality criterion;
adding the third attribute to the set of candidate attributes; and
generating a plurality of data entity segments using the set of candidate attributes and the plurality of data entities.

Clause 13. The computer-implemented method of clause 12, further comprising:
obtaining fourth attribute data representing values of a fourth attribute for each of the plurality of data entities;

determining that the fourth attribute data fails to satisfy the cardinality criterion;

generating fifth attribute data representing values of a fifth attribute, wherein the fifth attribute corresponds to the fourth attribute with a reduced degree of cardinality;

determining that the fifth attribute data fails to satisfies the cardinality criterion; and excluding the fifth attribute from the set of candidate attributes.

Clause 14. The computer-implemented method of clause 12, wherein generating the plurality of data entity segments comprises executing a clustering algorithm using the first attribute data and the third attribute data.

Clause 15. The computer-implemented method of clause 12, wherein determining that the first attribute data fails to satisfy the cardinality criterion comprises determining that a quantity of distinct values represented by the first attribute data fails to satisfies a threshold.

Clause 16. The computer-implemented method of clause 12, further comprising generating a user interface using the plurality of data entity segments, wherein the user interface enables a user to initiate at least one of: modification of a cardinality of a candidate attribute, or modification of the plurality of data entity segments.

Clause 17. The computer-implemented method of clause 16, further comprising:
  receiving interaction data representing a modification to a cardinality parameter associated with the third attribute; and
  generating fourth attribute data representing values of a fourth attribute, wherein the fourth attribute corresponds to the third attribute with a modified degree of cardinality.

Clause 18. The computer-implemented method of clause 16, further comprising:
  receiving interaction data representing a selection of a fourth attribute from the set of candidate attributes; and
  generating a second plurality of data entity segments from the plurality of data entities, wherein the second plurality of data entity segments is generated based on the fourth attribute.

Clause 19. The computer-implemented method of clause 16, further comprising:
  receiving interaction data representing a modification to a segmentation parameter associated generating the plurality of data entity segments; and
  generating a second plurality of data entity segments from the plurality of data entities, wherein the second plurality of data entity segments is generated based on the modification to the segmentation parameter.

Clause 20. The computer-implemented method of clause 12, further comprising sending data representing the plurality of data entity segments to a visitor processing system configured to manage types of data tracked for different visitors of a content site.

Clause 21. A computer-implemented method comprising:
  under control of a computing system comprising one or more processors configured to execute specific instructions,
    receiving a content page from a segmentation system, the content page comprising instructions for presenting a segmentation user interface;
    presenting the segmentation user interface comprising a plurality of display objects, wherein a first display object of the plurality of display objects represents a first segment of a data set, and wherein a second data object of the plurality of display objects represents a second segment of a data set;
    receiving input representing selection of at least one of a portion of the segmentation user interface, wherein portion of the segmentation user interface relates to at least one of:
      cardinality of an attribute associated with segmentation of the data set;
      a candidate attribute to be used in segmentation of the data set; or
      a segmentation parameter for segmentation of the data set;
    sending, to the segmentation system, a message based at least partly on the input; and
    receiving, in response to the message, and updated content page comprising instructions for presentation of an updated segmentation user interface.

Clause 22. The computer-implemented method of clause 21, further comprising presenting the updated segmentation user interface, wherein the message comprises data representing a modification to cardinality of the attribute, and wherein the updated segmentation user interface comprises a second plurality of display objects based on the modification to the segmentation parameter.

Clause 23. The computer-implemented method of clause 21, further comprising presenting the updated segmentation user interface, wherein the message comprises data representing a modification to a set of candidate attributes, and wherein the updated segmentation user interface comprises a second plurality of display objects based on the modification to the set of candidate attributes.

Clause 24. The computer-implemented method of clause 21, further comprising presenting the updated segmentation user interface, wherein the message comprises data representing a modification to the segmentation parameter, and wherein the updated segmentation user interface comprises a second plurality of display objects based on the modification to the segmentation parameter.

Terminology

Depending on the embodiment, certain acts, events, or functions of any of the processes or algorithms described herein can be performed in a different sequence, can be added, merged, or left out altogether (e.g., not all described operations, sequencing, or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
as performed by a computing system comprising one or more computer processors configured to execute specific instructions,
obtaining first attribute data representing values of a first attribute for each of a plurality of data entities;
generating a new attribute representing ranges of values of the first attribute data, wherein the new attribute satisfies a cardinality criterion;
adding the new attribute to a set of candidate attributes;
generating a plurality of data entity segments using the set of candidate attributes and the plurality of data entities;
generating a user interface comprising a visual representation of the plurality of data entity segments, wherein the user interface enables a user to initiate a modification to a target degree of cardinality of a candidate attribute of the set of candidate attributes;
receiving a user input via the user interface; and
modifying at least one of a data entity segment or the candidate attribute based on the user input.

2. The computer-implemented method of claim 1, wherein the user input represents a modification of a degree of cardinality of the candidate attribute, the computer-implemented method further comprising:
determining that first candidate attribute data fails to satisfy the degree of cardinality subsequent to the modification;
generating second candidate attribute data representing values of a second candidate attribute, wherein the second candidate attribute corresponds to the candidate attribute with the degree of cardinality subsequent to the modification; and adding the second candidate attribute to the set of candidate attributes.

3. The computer-implemented method of claim 2, wherein determining that the first candidate attribute data fails to satisfy the cardinality criterion comprises determining that a quantity of values represented by the first candidate attribute data fails to satisfy a threshold.

4. The computer-implemented method of claim 2, further comprising generating a second user interface using the set of candidate attributes with the second candidate attribute.

5. The computer-implemented method of claim 1, wherein the user input represents a modification of a confidence interval for the candidate attribute, the computer-implemented method further comprising:

determining that at least a portion of first candidate attribute data associated with the candidate attribute fails to satisfy the confidence interval subsequent to the modification;

generating second candidate attribute data representing values of a second candidate attribute, wherein the second candidate attribute corresponds to a portion of the candidate attribute satisfying the confidence interval subsequent to the modification; and adding the second candidate attribute to the set of candidate attributes.

6. The computer-implemented method of claim 5, further comprising generating a second user interface using the set of candidate attributes with the second candidate attribute.

7. The computer-implemented method of claim 1, wherein the user input represents a modification of attributes in the data entity segment, the computer-implemented method further comprising generating a second plurality of data entity segments based on the modification of attributes in the data entity segment.

8. The computer-implemented method of claim 7, further comprising generating a second user interface using the second plurality of data entity segments.

9. The computer-implemented method of claim 1, further comprising:

obtaining second attribute data representing values of a second attribute for each of the plurality of data entities;

determining that the second attribute data fails to satisfy the cardinality criterion;

generating third attribute data representing values of a third attribute, wherein the third attribute corresponds to the second attribute with a reduced degree of cardinality;

determining that the third attribute data satisfies the cardinality criterion; and adding the third attribute to the set of candidate attributes.

10. The computer-implemented method of claim 9, wherein determining that the second attribute data fails to satisfy the cardinality criterion comprises determining that a quantity of values represented by the second attribute data fails to satisfy a threshold.

11. A system comprising:

computer-readable memory storing executable instructions; and one or more processors programmed by the executable instructions to at least:

obtain first attribute data representing values of a first attribute for each of a plurality of data entities;

generate a new attribute representing ranges of values of the first attribute data, wherein the new attribute satisfies a cardinality criterion;

add the new attribute to a set of candidate attributes;

generate a plurality of data entity segments using the set of candidate attributes and the plurality of data entities;

generate a user interface comprising a visual representation of the plurality of data entity segments, wherein the user interface enables a user to initiate a modification to a target degree of cardinality of a candidate attribute of the set of candidate attributes;

receive a user input via the user interface; and modify at least one of a data entity segment or the candidate attribute based on the user input.

12. The system of claim 11, wherein the user input represents a modification of a degree of cardinality of the candidate attribute, and wherein the one or more processors are further programed by the executable instructions to:

determine that first candidate attribute data fails to satisfy the degree of cardinality subsequent to the modification;

generate second candidate attribute data representing values of a second candidate attribute, wherein the second candidate attribute corresponds to the candidate attribute with the degree of cardinality subsequent to the modification; and add the second candidate attribute to the set of candidate attributes.

13. The system of claim 12, wherein to determine that the first candidate attribute data fails to satisfy the cardinality criterion, the one or more processors are further programmed by the executable instructions to determine that a quantity of values represented by the first candidate attribute data fails to satisfy a threshold.

14. The system of claim 12, wherein the one or more processors are further programed by the executable instructions to generate a second user interface using the set of candidate attributes with the second candidate attribute.

15. The system of claim 11, wherein the user input represents a modification of a confidence interval for the candidate attribute, and wherein the one or more processors are further programed by the executable instructions to:

determine that at least a portion of first candidate attribute data fails to satisfy the confidence interval subsequent to the modification;

generate second candidate attribute data representing values of a second candidate attribute, wherein the second candidate attribute corresponds to a portion of the candidate attribute satisfying the confidence interval subsequent to the modification; and add the second candidate attribute to the set of candidate attributes.

16. The system of claim 15, wherein the one or more processors are further configured by the executable instructions to generate a second user interface using the set of candidate attributes with the second candidate attribute.

17. The system of claim 11, wherein the user input represents a modification of attributes in the data entity segment, and wherein the one or more processors are further configured by the executable instructions to generate a second plurality of data entity segments based on the modification of attributes in the data entity segment.

18. The system of claim 17, wherein the one or more processors are further configured by the executable instructions to generate a second user interface using the second plurality of data entity segments.

19. The system of claim 11, wherein the one or more processors are further configured by the executable instructions to:
- obtain second attribute data representing values of a second attribute for each of the plurality of data entities;
- determine that the second attribute data fails to satisfy the cardinality criterion;
- generate third attribute data representing values of a third attribute, wherein the third attribute corresponds to the second attribute with a reduced degree of cardinality;
- determine that the third attribute data satisfies the cardinality criterion; and
- add the third attribute to the set of candidate attributes.

20. The system of claim 19, wherein to determine that the second attribute data fails to satisfy the cardinality criterion, the one or more processors are further programmed by the executable instructions to determine that a quantity of values represented by the second attribute data fails to satisfy a threshold.

* * * * *